United States Patent
Kumano et al.

[11] Patent Number: 5,939,181
[45] Date of Patent: Aug. 17, 1999

[54] POROUS MOLDED ARTICLE

[75] Inventors: Yuuta Kumano; Mitsutoshi Aritomi; Kenji Takasaki; Osamu Nishizawa, all of Mie; Nobuhiro Shibuya; Hisao Ochiai, both of Ibaraki; Kenji Nakajima, Tokyo, all of Japan

[73] Assignee: Oji-Yuka Synthetic Paper Co., Ltd., Tokyo, Japan

[21] Appl. No.: 08/927,225

[22] Filed: Sep. 10, 1997

[30] Foreign Application Priority Data

Nov. 19, 1996 [JP] Japan ................................. 8-322135
Apr. 23, 1997 [JP] Japan ................................. 9-118671

[51] Int. Cl.$^6$ ................................................... B32B 3/26
[52] U.S. Cl. ................................. 428/315.5; 428/304.4; 428/910
[58] Field of Search ..................... 428/304.4, 315.5, 428/910

[56] References Cited

U.S. PATENT DOCUMENTS 5,670,225 9/1997 Yamanaka et al. .................. 428/315.5

FOREIGN PATENT DOCUMENTS 9-111058 4/1997 Japan .

*Primary Examiner*—James J. Bell
*Attorney, Agent, or Firm*—Oblon, Spivak, McClelland, Maier & Neustadt, P.C.

[57] ABSTRACT

A porous molded article having microvoids therein which comprises a stretched product of a resin molded material made up of, as the base material, an olefinic resin composition containing from 95 to 50% by weight of a crystalline olefinic resin component (A) and from 5 to 50% by weight of a polymer of a cyclic olefin having a weight average molecular weight of not less than 1,000 and less than 10,000 and a glass transition point of from 180 to 400° C. component (B).

15 Claims, 1 Drawing Sheet

POROUS MOLDED ARTICLE

BACKGROUND OF THE INVENTION

1. Field of the Invention

The present invention relates to a porous molded article comprising a stretched film having continuous or closed microvoids therein. More specifically, the present invention relates to a porous molded article composed of a crystalline olefinic resin matrix and a cyclic olefin polymer island dispersed therein.

The porous molded article has excellent printability and is useful as synthetic paper and packing material.

2. Description of the Background

Hitherto, a porous molded article made up of a crystalline olefinic resin and having microvoids has been widely used as fine porous films and hollow fibers for use as filters; liquid permeable films and diaphragms for use as separators; gas-permeable films for use as packing materials; moisture-permeable waterproof films for use as clothes; synthetic papers for printing; etc.

These porous molded articles having microvoids made up of a crystalline olefinic resin have been produced by the following methods.

1) A film made up of a blend of a crystalline olefinic resin and fine inorganic particles is stretched whereby microvoids are formed in the interface between the crystalline olefinic resin and each of the fine inorganic particles as described in *Kobunshi Ronbun Shu* (*Collected High Molecular Theses*), Vol. 48, No. 8, 463(1991); ibid., Vol. 48, No. 8, 491(1991), JP-B-46-40794 (the term "JP-B" as used herein means an "examined published Japanese patent application), etc.

2) A film made up of a blend of a crystalline olefinic resin and a polymer component which is incompatible with the crystalline olefinic resin, such as polyamide, polycarbonate, polybutylene terephthalate, or the like, is stretched, which results in the formation of microvoids at the interface between the crystalline olefinic resin and the polymer component as described in JP-A-59-209849 (the term "JP-A" as used herein means an "unexamined published Japanese patent application", JP-B-3-24334), etc.

3) A film of a crystalline olefinic resin to which has been previously added a specific large amount of an additive such as plasticizer, or the like, is prepared, and then the additives are extracted using an organic solvent, water, etc., to form continuous holes in the film as described in JP-A-60-242035, JP-A-7-309965, etc.

However, the conventional methods have the following problems.

That is, in method 1) of stretching the film made up of the blend of a crystalline olefinic resin and fine inorganic particles which form microvoids at the interface between the crystalline olefinic resin and each of the inorganic particles, when the fine inorganic particles are blended with the crystalline olefinic resin, thereby resulting in many microvoids or the formation of continuous fine holes, it is required to blend a large amount of the fine inorganic particles. Accordingly, the specific gravity of the obtained film becomes large and secondary aggregation of the fine inorganic particles occurs easily. It makes the diameters of the microvoids formed in the film not only nonuniform, but also the film fractures when stretched because the aggregated particles act as the fracture points, which make it difficult to achieve stretching at a high ratio, whereby it is very difficult to form a thin film. Also, there are problems that surface roughness on the surface of the stretched film occurs and a part of the largely blended fine inorganic particles falls from the surface to make the processing machine dusty.

In the case of method 2), because the dispersibility of the polymer component which is incompatible with the crystalline olefinic resin is generally poor, when using a large amount of the polymer component, the islands of the polymer dispersed in the crystalline olefinic resin matrix become coarse particles, and microvoids cannot be formed in the film, and also the stretching temperature range is narrowed. Also, if a lesser amount of the polymer component incompatible with the crystalline olefinic resin is used, the light transmittance of the stretched film is high and an opaque stretched film is not obtained.

In method 3) of previously adding a specifically large amount of an additive such as a plasticizer, etc., to a crystalline olefinic resin and during or after the formation of film, extracting the additive using a solvent to form continuous holes, a large amount of the additive and the extraction step are required. In this method, the continuous holes are the result of the extraction, that is, the continuous holes are not formed if the extraction step is not applied.

Also, in method 3), in order to obtain the continuous holes in a high amount, an amount of additive, 2 to 3 times or even more of the amount of the crystalline olefinic resin is required. Thus, in method 3), the operation is very complicated and also production costs become high, which make mass production difficult.

As described above, in the above-described conventional techniques of producing porous molded articles, problems are encountered which make it very difficult to prepare a porous molded article of a thin film having many microvoids by stretching at a high ratio. That is, a production method requiring a complicated operation must be used.

As a means of solving these problems, JP-A-8-27294 provides a resin-stretched film made of, as the base material, a thermoplastic resin containing (A) from 50 to 95% by weight a propylene series resin and (B) from 5 to 50% by weight a cyclic olefinic resin selected from an open-ring polymer or an open-ring copolymer induced from a cyclic olefin, the hydrogenated product of said polymer or copolymer, and an addition polymer of a cyclic olefin and represented by formula (1) and ethylene, said cyclic olefinic resin having a limiting viscosity [η] measured in decalin at 135° C. of from 0.05 to 10 dl/g and a softening temperature of from 145 to 170°;

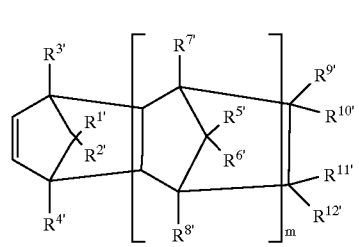

(1)

wherein m represents 0 or a positive integer and $R^{1'}$ to $R^{12'}$ each independently represents a hydrogen atom, a halogen atom, or a hydrocarbon group; said $R^{9'}$ to $R^{12'}$ may combine with each other to form a monocyclic or polycyclic group; and said $R^{9'}$ and $R^{10'}$ or said $R^{11'}$ and $R^{12'}$ may together form an alkylidene group, said opaque resin stretched film have fine holes wherein the voids of the resin stretched film is in the range of from 20 to 70% and the film having an opacity of at least 75%.

However, when print is applied onto the opaque, stretched resin film with an offset ink which is used for quick drying offset printing, the olefinic resin of the film matrix is swelled with the vehicle in the ink which results in partial unevenness on the surface of the printed stretched film or when printing is applied onto the whole surface of the stretched film, the whole stretched film is curled. That is, when printing is applied to the opaque, stretched resin film, a so-called solvent attack occurs which makes it difficult to practically use the opaque, stretched olefinic resin film.

The composition of a drying type offset ink widely used is shown in Table 1 and Table 2.

TABLE 1

Fundamental Composition of Offset Ink

Offset Ink
- Principal agents
  - Pigments
    - Organic pigment
    - Inorganic pigment
  - Vehicles
    - Synthetic resin
    - Vegetable oil (drying oil)
    - Solvent
- Auxiliaries
  - Viscosity controlling agent
    - Solvent
    - Diluted varnish
    - Compound
  - Dry controlling agent
    - Drying agent (dryer)
    - Dry inhibitor
  - Others —— Wax, coat reinforcing agent, set-off inhibitor, etc.

TABLE 2

Composition of Offset Printing Ink (weight part)

|  | Widely-Use Offset Printing Ink | Specific Offset Printing Ink For Non-absorptive Material |
| --- | --- | --- |
| Pigment | 15 to 50 (30) | (25) |
| Resin | 25 to 30 (20) | (30) |
| Dry oil | 10 to 15 (10) | (34) |
| H. B. Pet. Solv.* | 20 to 45 (35) | (5) |
| Dryer | 0.5 to 2 (1) | (2) |
| Others | 2 to 5 (4) | (4) |
|  | (100) | (100) |

(*): High-Boiling Petroleum Solvent

Accordingly, a specific offset ink formulated at a sacrifice to its drying property is practically used as the offset printing ink for olefinic resin films. However, because in the case of the specific offset ink for the olefinic resin films, the drying time is long and the printing shops and the ink makers are limited to specific formulations, the development of an olefinic resin film for which a wide-use offset ink can be used has been desired.

SUMMARY OF THE INVENTION

Accordingly, one object of the present invention is to provide an olefinic resin for a porous molded article which has excellent opacity and which does not experience solvent attack when a widely-use offset printing ink for woodfree papers is used.

According to a first aspect of the invention, a porous molded article having microvoids in the inside of the molded article is provided by stretching a product of a molded resin article made up of an olefinic resin composition comprising from 95 to 50% by weight of a crystalline olefinic resin component (A) and from 5 to 50% by weight of component (B) of a polymer of a cyclic olefin having a weight average molecular weight of not less than 1,000 and less than 10,000, and having a glass transition point of from 180 to 400° C., as the base material.

According to a second aspect of the present invention, a porous molded article is provided which has a voids volume of from 20 to 70% as determined by the following equation of from 20 to 70%:

$$\text{Voids}(\%) = [(\rho_o) - (\rho)]/(\rho_o) \times 100$$

wherein $(\rho_o)$ is the density of the film before stretching, and $(\rho)$ is the density of the film after stretching, the film being obtained by stretching a resin film comprising from 95 to 50% by weight of a propylene series resin component (A) and from 5 to 50% by weight of a component (B) of a vinylene polymer of a cyclic olefin having a constituent unit of the formula (III) or (IV), having a weight average molecular weight of from 2,000 to 7,000 and having a glass transition point of from 180 to 270° C., at a temperature lower than the melting point of the component (A) and at a temperature lower than the glass transition point of the vinylene polymer of the cyclic olefin of component (B)

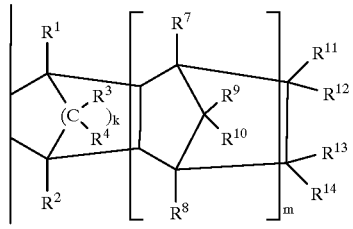

(III)

wherein $R^1$ to $R^4$ and $R^7$ to $R^{14}$ each independently represents hydrogen, a hydrocarbon group having from 1 to 20 carbon atoms, or a substituent containing a halogen atom; $R^9$ and any one of $R^{11}$ to $R^{14}$ or $R^{10}$ and any one of $R^{11}$ to $R^{14}$ may combine with each other to form a ring; k represents an integer of from 0 to 4; and m represents an integer of from 0 to 8; also in the constituent unit of formula (III), $R^1$ to $R^{14}$ or k and m may be different;

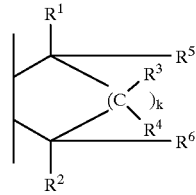

(IV)

wherein $R^1$ to $R^4$ each independently represents hydrogen, a hydrocarbon group having from 1 to 20 carbon atoms, or a substituent containing a halogen atom: $R^5$ and $R^6$ each represents a hydrogen atom; and k represents an integer of from 0 to 4, as the base material.

The porous molded article of the present invention is obtained by stretching a film made up of, as the base material, a crystalline olefinic resin composition containing the crystalline olefinic resin and the cyclic olefin polymer having a weight average molecular weight of not less than 1,000 and less than 10,000. The porous molded article is useful for the manufacture of synthetic paper which does not experience a solvent attack during printing.

Also, because the cyclic olefin polymer has a proper compatibility with the crystalline olefinic resin, the stretching temperature range of the film can be widened and also by stretching the film, fine microvoids form in the inside of the stretched film to provide a porous molded article having a proper opacity.

DETAILED DESCRIPTION OF THE PREFERRED EMBODIMENTS

Figure 1:
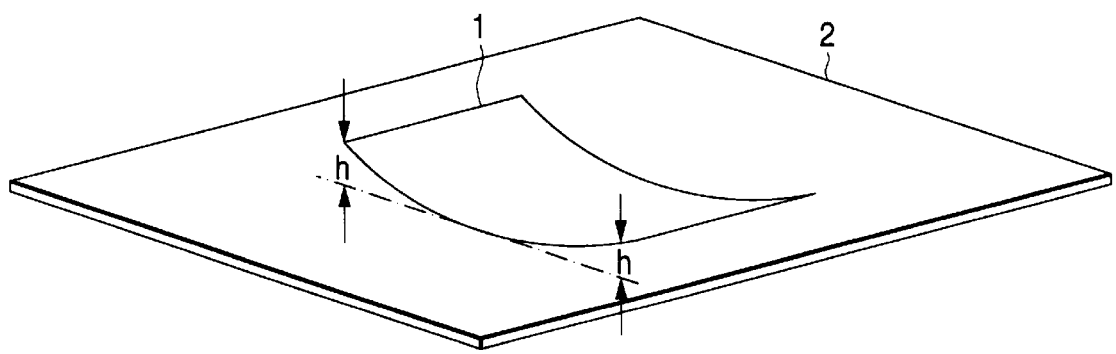
FIG. 1 is a slant view showing the method of measuring the height of the curl of the printed matter in the example of the present invention.

The present invention is described in detail below.

[1] Crystalline olefinic resin composition:

The porous molded article of the present invention is formed by stretching a film made up of, as the base material, the crystalline olefinic resin composition containing (A) a crystalline olefinic resin and (B) a cyclic olefin polymer having a weight average molecular weight of not less than 1,000 and less than 10,000, and preferably from 2,000 to 7,000, and having a glass transition point of from 180 to 400° C., preferably from 180 to 270° C., and particularly preferably from 200 to 270° C.

Component (A): Crystalline olefinic resin

Suitable crystalline olefinic resins of component (A) include a homopolymer of an a-olefin having from 2 to 12 carbon atoms such as ethylene, propylene, 1-butene, 3-methyl-1-butene, 4-methyl-1-pentene, 1-hexene, 1-pentene, 1-octene, etc.; copolymers (random copolymers or block copolymers) of two or more kinds of the α-olefins; copolymers of the above-described α-olefins, etc. The crystallinity of each of the polymers calculated by a density method (*Industr. Plast., Mod.* Jan. p. 40 (1958)) ranges from 20 to 100%, preferably from 30 to 90%, and particularly preferably from 40 to 85%. Also, there is no particular restriction on the melt flow rate (MFR) of each of the polymers, but it is most suitable that the value measured at 230° C. and 2.16 kg according to the method of ASTM-D1238 is in the range of usually from 0.001 to 100 g/10 minutes, and preferably from 0.01 to 50 g/10 minutes.

Also, the melting point of the crystalline olefinic resin is a peak temperature of DSC curve obtained by differential scanning calorimetry (DSC) according to JIS K7121-1987 ranges from 120 to 245° C., preferably from 130 to 190° C., and particularly preferably from 140 to 180° C.

The above-described crystalline olefinic resin includes, for example, an ethylene series resin having a density of 0.890 to 0.970 g/cm$^3$ such as so-called low-pressure polyethylene, intermediate-pressure polyethylene, high-pressure polyethylene, linear low-density polyethylene, etc., and stereoregular poly-α-olefinic resins such as stereoregular polypropylene including isotactic polypropylene and syndiotactic polypropylene, stereoregular poly-1-butene, stereoregular poly-3-methyl-1-butene, stereoregular poly-4-methyl-1-pentene, etc. Of these crystalline olefinic resins, stereoregular polypropylene (hereinafter, referred to as a propylene series resin) is preferred.

Also, of these propylene series resins, a propylene homopolymer and a block copolymer and random copolymer of propylene and ethylene are preferred and a propylene homopolymer is particularly preferred.

The propylene series resins can be used singly or in mixed combination and usually the propylene series resin used can be suitably selected from commercially available resins.

For the propylene series resins, the crystallinity is preferably from 20 to 70%, the melting point (the peak temperature of DSC), and the value of the melt flow rate measured at 230° C. and 2.16 kg according to ASTH-D1238 is in the range of from 0.1 to 50 g/10 minutes, and preferably from 0.3 to 15 g/10 minutes.

Component (B): Polymer of cyclic olefin

Suitable cyclic olefin polymers of component (B) include the homopolymer of a cyclic olefin selected from the monocyclic olefins represented by formula (I) such as cyclobutenes, cyclopentenes, cyclohexenes, and the like, and the polycyclic olefins represented by formula (II) such as norbornenes, tricyclo-3-decenes, and the like, and the mutual copolymers of 2 or more of said cyclic olefins. The weight average molecular weight (polypropylene conversion) of the cyclic olefin polymer ranges from 1,000 to less than 10,000, and preferably from 2,000 to 7,000 and the glass transition temperature thereof ranges from 180 to 400° C., preferably from 180 to 270° C., and particularly preferably from 200 to 270° C.

Examples of the cyclic olefin which are used as the monomer include the monocyclic olefins represented by formula (I), for example, cyclopentenes such as cyclobutene, cyclopentene, 4-methylcyclopentene, etc.; cyclohexenes such as cyclohexene, 3-methylcyclohexene, 4-ethylcyclohexene, etc.; and the polycyclic olefins represented by formula (II), for example, norbornenes such as norbornene, 1-methylnorbornene, 5-methyl-2-norbornene, 5-ethyl-2-norbornene, methylenenorbornane, 5-butyl-2-norbornene, 5-octyl-2-norbornene, 7,7-dimethyl-2-norbornene, 1,7,7-trimethylbicyclo[2,2,1]heptane-2-ene; tricyclo-3-decenes such an tricyclo[4,3,0,1$^{2.5}$]-3-decene, 2-methyltricyclo[4,3,0,1$^{2.5}$]-3-decene, etc.; tetracyclo-3-dodecenes such as tetracyclo[4,4,0,1$^{2.5}$,1$^{7.10}$]-3-dodecene, 8-methyltetracyclo[4,4,0,1$^{2.5}$,1$^{7.10}$]-3-dodecene, 5,10-dimethyltetracyclo[4,4,0,1$^{2.5}$,1$^{7.10}$]-3-dodecene, etc.; pentacyclopentadecenes such as pentacyclo[6,5,1,1$^{3.6}$0$^{2.7}$,0$^{9.13}$]-4-pentadecene, 10-methylpentacyclo[6,5,1,1$^{3.6}$,0$^{2.7}$,0$^{9.13}$]-4-pentadecene, pentacyclo[4,7,0,1$^{2.5}$,0$^{8.13}$,1$^{9.12}$]-3-pentadecene, and the like; hexacyclo[6,6,1$^{3.6}$,1$^{10.13}$,0$^{2.7}$, 0$^{9.14}$]-4-heptadecenes, and the like.

The polymer of the above-described cyclic olefin includes the polymer in the polymerization state obtained by a vinylene polymerization, that is the addition polymerization product of carbon-carbon double bond portions to each other, the ring-opening polymerization product, the hydrogenation product of the open-ring polymer, a polymer obtained by reducing the molecular weight of the high molecular weight cyclic olefin polymer polymerized in any one of the above-described polymerization states with a peroxide, etc. In these polymers, a vinylene polymer obtained by vinylene-polymerizing a cyclic olefin having the glass transition point of from 180 to 400° C., and preferably from 200 to 270° C. is most preferred.

The said vinylene polymer is a polymer obtained by the addition polymerization of a cyclic olefin represented by formula (I) or (II) via the ethylenically unsaturated bond of the cyclic olefin using a specific organic transition metal compound and an organoaluminumoxy compound as the catalyst. The structure of the polymer has the constituent unit represented by formula (III) or (IV).

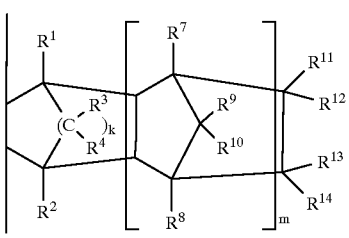

(III)

wherein $R^1$ to $R^4$ and $R^7$ to $R^{14}$ each independently represents hydrogen, a hydrocarbon group having from 1 to 20 carbon atoms, or a substituent containing a halogen atom; $R^9$ and any one of $R^{11}$ to $R^{14}$ or $R^{10}$ and any one of $R^{11}$ to $R^{14}$ may combine with each other to form a ring; k represents an integer of from 0 to 4; and m represents an integer of from 0 to 8; also in the constituent unit shown by formula (III), $R^1$ to $R^{14}$ or k and m may be different.

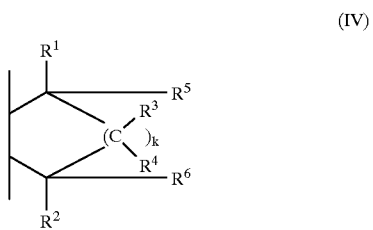

(IV)

wherein $R^1$ to $R^4$ each independently represents hydrogen, a hydrocarbon group having from 1 to 20 carbon atoms, or a substituent containing a halogen atom; $R^5$ and $R^6$ each represents hydrogen; and k represents an integer of from 0 to 4.

As the polymerization method of the vinylene polymer resulting from the cyclic olefin, any conventional polymerization method can be employed such as slurry polymerization, vapor-phase polymerization, bulk polymerization, solution polymerization and suspension polymerization. More preferred methods are slurry polymerization, solution polymerization and bulk polymerization. Also, the polymerization may be carried out by a batch system or by a continuous system.

The organic transition metal compound and the organoaluminumoxy compound, which are constituent components of the polymerization catalyst for the cyclic olefin polymer may be separately added to the polymerization system regardless of the presence or absence of the monomer(s) and the catalyst system may be formed by contacting both compounds in the polymerization system, or after forming the catalyst system by previously contacting both the catalyst components before adding the catalyst to the polymerization system. The catalyst thus formed may be introduced into the polymerization system.

The order of contacting the catalyst components for forming the catalyst system may vary.

The formation of the catalyst system can be carried out by contacting the catalyst components, for example, in an inert solvent and in an inert gas atmosphere.

A suitable catalyst for the production of the cyclic olefin polymer of the present invention include the following.

That is, a catalyst system containing as catalyst components one of the transition metal complexes of the following two formulae;

$(C_5R_n)X(C_5R_n)MeQ_2$ or $(C_5R_n)X_aY_bMeQ_{3-b}$ wherein Me represents a transition metal of Group 4 of the Periodic Table, such as Zr or Rf; each $(C_5R_n)$ represents cyclopentadienyl or a substituted cyclopentadienyl group; plural Rs may be the same or different with each representing hydrogen, an alkyl group having from 1 to 20 carbon atoms, an alkenyl group having from 1 to 20 carbon atoms, an aryl group having from 6 to 20 carbon atoms, an alkylaryl group having 7 to 20 carbon atoms, or an arylalkyl group having 7 to 20 carbon atoms; X represents an alkylene group having from 1 to 4 carbon atoms or a silicon atom crosslinking the two $(C_5R_n)$ rings or the $(C_5R_n)$ ring and Y; $\underline{a}$ represents an integer of from 0 to 4; b represents 0 or 1; and when $\underline{a}$=0, b=0 plural Qs may be the same or different, each represents an alkyl group having from 1 to 20 carbon atoms, an aryl group having 6 to 20 carbon atoms, an alkenyl group having 1 to 20 carbon atoms, an alkylaryl group having 7 to 20 carbon atoms, an arylalkyl having 7 to 20 carbon atoms, an alkylidene group having 1 to 20 carbon atoms, or halogen; Y represents an oxygen atom, a nitrogen atom, a phosphorus atom, or a sulfur atom; and n represents a number of from 0 to 4 in combination with aluminoxane is suitably used.

In addition, the molecular wight of the cyclic olefin polymer can be controlled by adding a proper amount of hydrogen when polymerizing the cyclic olefin using the above-described catalyst.

The polymerization temperature is in the range of usually from −78° C. to +150° C., and preferably from −30° C. to +80° C. Also, the amounts of the organic transition metal compound and the organoaluminumoxy compound used, which are the constituent components of the catalyst system, are optional in the applicable range. For example, in the case of a solution polymerization system, the amount of the organic transition metal compound used is in the range of preferably from $1 \times 10^{-7}$ to $1 \times 10^2$ mmols/liter, and particularly preferably from $1 \times 10^{-4}$ to 10 mmols/liter. Also, the amount of the organoaluminumoxy compound used is determined by the mol ratio of aluminum/transition metal in the range of from 10 to 100,000, preferably from 100 to 10,000. For the amount of the cyclic olefin which is used as a monomer, the mol ratio of the raw material monomer/the transition metal compound ranges from 1 to 1,000,000, preferably from 100 to 100,000. Also, in order to control the molecular wight of the polymer, the kind and amount of each catalyst component is appropriately selected, as well as the polymerization temperature, the polymerization time, etc., and whether hydrogen should be present.

In the case of the polymerization catalyst, a polymerization solvent which is usually used in the polymerization method of this kind, for example, halogenated hydrocarbons such as methylene chloride, 1,2-dichloroethane, and the like; aliphatic hydrocarbons such as pentane, hexane, heptane, octane, and the like; alicyclic hydrocarbons such as cyclopentane, cyclohexane, and the like; aromatic hydrocarbons such as benzene, toluene, xylene, and the like; petroleum fractions such as gasoline, kerosene, light oil, and the like, and mixtures thereof can be used. In these polymerization solvents, the aromatic hydrocarbons are particularly preferred.

As to the molecular weight of the cyclic olefin polymer of the present invention, the weight average molecular weight (propylene conversion) measured by gel permeation chromatography (GPC) is in the range of not less than 1,000 and less than 10,000, preferably from 2,000 to 7,000, and particularly preferably from 2,500 to 5,000. If the weight average molecular weight is less than 1,000, the fine-hole forming capability upon stretching the molded material becomes undesirably lower and if the average molecular weight is more than 10,000, the compatibility of the cyclic olefin polymer with the crystalline olefinic resin is decreased and the stretching molding temperature range narrows.

Also, the glass transition point (Tg) of the cyclic olefin polymer measured by a differential scanning calorimetry is the mid-point temperature of glass transition (Tmg) obtained by differential scanning calorimetry according to JIS K7121-1987 and is in the range of from 180 to 400° C., preferably from 180 to 270° C., and more preferably from 200 to 270° C. If the glass transition point of the cyclic olefin polymer is lower than the above-described range, microvoids are not formed upon stretching of the film and if the glass transition point is higher than the above range, the preparation temperature of the resin composition becomes high and the olefinic resin of the component (A) is liable to deteriorate by oxidation.

In these cyclic olefin polymers, the vinylene polymer of the polycyclic olefin mainly using the polycyclic olefin(s) is preferred because the vinylene polymer widens the stretching temperature range in the invention and promotes the effect of forming microvoids.

Suitable polycyclic olefin polymers include a homopolymer of the polycyclic olefin, a mutual copolymer of the polycyclic olefins, a mutual copolymer of the polycyclic olefin and a monocyclic olefin, and the like.

Also, in the polycyclic olefin polymers, a polymer using the norbornene series cyclic olefin having formula (II), wherein m is 0 and k is 1, is preferred because in the case of using the olefin, the molecular weight of the polymer formed can be easily controlled and a high polymerization activity is realized. Suitable norbornene series polymers include a homopolymer of the norbornene series cyclic olefin, a mutual copolymer of the norbornenes, a mutual copolymer of the norbornene series cyclic olefin and other cyclic olefin, and the like.

In these norbornene series polymers, the homopolymers of norbornenes and the mutual copolymers of norbornenes and other cyclic olefin are preferred and the norbornene homopolymer is particularly preferred because the yield of the polymer is high.

These cyclic olefin polymers can be used singly or as a mixture of several kinds thereof.

Also, in the cyclic olefin polymer, the circle olefin may be copolymerized with an α-olefin such as ethylene, propylene, etc., or an aromatic vinyl compound such as styrene, α-styrene, or the like, in a range which does not reduce the effects of the present invention.

In addition, in regard to component (A) and component (B) which constitute the crystalline olefinic resin composition of the present invention, the combination of the above-described components each other is, as a matter of course, most suitable.

Component (C): Additional components (1) Other components

The olefinic resin composition used in the present invention can further contain additional components as shown below in the range which does not greatly reduce the effects of the present invention in addition to the above-described components (A) and (B).

As the additional component, a chemically modified polyolefin: polypropylene or polyethylene graft-modified with an unsaturated carboxylic acid such as methacrylic acid, maleic anhydride, or the like; or a thermoplastic resin having a melting point of from 200 to 350° C., such as nylon 6, nylon 66, polyethylene terephthalate, polybutylene terephthalate, or the like, may be compounded with the olefinic resin composition in an amount of not more than 20% by weight of the base material of the molded material.

Also as an additional component, fillers can be employed. The filler is favorable because the rigidity and the dimensional stability of the polymer can be controlled and the amount of the filler is preferably 50% by weight or lower of the base material of the molded material.

As the filler, an inorganic filler or an organic filler can be used and the form thereof may be tabular, spherical, fibrous, or amorphous.

Practically, the filler used in this invention includes natural silica, synthetic silica produced by a wet method or a dry method; natural silicates such as kaolin, clay, mica, talc, asbestos, and the like; synthetic silicates such as calcium silicate, aluminum silicate, and the like; carbonates such as calcium carbonate, and the like; metal hydroxides such as magnesium hydroxide, aluminum hydroxide, and the like; metal oxide compounds such as alumina, titanium oxide, titania, and the like.

Of these fillers, talc and calcium carbonate are preferred.

The filler may be subjected to a surface treatment with a surface active agent, a coupling agent, or the like. Also, the fillers may be used singly or as a mixture of several kinds thereof. Furthermore, the filler can be properly selected from commercially available fillers.

Other additional components employed in this invention include, for example, plasticizers, fluidity improving agents, coloring agents, antioxidants, neutralizing agents, light stabilizers, ultraviolet inhibitors, antistatic agents, lubricants, nucleating agents, dispersion aids, molecular weight controlling agents, crosslinking agents, flame retardants, and the like.

(2) Compounded amount ratio

The above-described components which constitute the resin composition of the present invention can be compounded such that based on 100% by weight the total of the crystalline olefinic resin of component (A) and the cyclic olefin polymer of component (B), the crystalline olefinic resin of component (A) is in the range of from 95 to 50% by weight, and preferably from 90 to 65% by weight and the cyclic olefin polymer of component (B) is in the range of from 5 to 50% by weight, and preferably from 10 to 35% by weight.

If the compounding ratio of the component (A) is more than 95% by weight or the compounding ratio of the component (B) is less than 5% by weight, the amount of voids which form is insufficient, while if the compounding ratio of the component (A) is less than 50% by wight or the compounding ratio of the component (B) is more than 50% by weight, the moldability of the product is undesirably reduced which easily causes fracturing the molded article upon stretching.

(3) Mixing

By mixing the components described above, the resin composition used as the base material of the molded article is prepared.

Different mixing techniques can be employed which include mixing of the components in a molten state by heating, mixing of the components in a dissolved state in an organic solvent, mixing of the components in a polymerized state, or a combination of these mixing techniques.

Suitable apparatus used for mixing in the molten state by heating include a Brabender plastograph, a uniaxial or biaxial extruder, a strong-screw-type kneader, a bambury mixer, a kneader, a roll mixer, etc., and the like.

For mixing in the dissolved state in an organic solvent, a preferred method is to simultaneously dissolve the above-described constituents in an organic solvent or to mix solutions of each constituent formed by dissolving each constituent in an organic solvent, and thereafter removing the organic solvent or the organic solvents.

Suitable organic solvents, include halogenated hydrocarbons such as methylene chloride, 1,2-dichloroethane, and the like; aliphatic hydrocarbons such as pentane, hexane, heptane, octane, and the like; alicyclic hydrocarbons such as cyclopentane, cyclohexane, and the like; petroleum fractions such as gasoline, kerosene, light oil, and the like, and mixtures thereof. Of these organic solvents, aromatic hydrocarbons are particularly preferred.

For mixing in the polymerized state, preferred methods are to mix polymer liquids each formed by solution polymerizing each constituent, and a two-stage polymerization method of after polymerizing one constituent and a polymerizing the other constituent followed by mixing.

Examples of combining the above-described mixing methods include (i) a method of mixing the components in the dissolved state(s) in organic solvent(s), and after removing the organic solvent(s), further kneading the residues in the molten state, (ii) a method of adding the cyclic olefin polymer of component (B) swelled with a small amount of an organic solvent to the crystalline olefinic resin of component (A) in the molten state, and while melt mixing, removing the organic solvent, and a method of polymerizing the α-olefins constituting the crystalline olefinic resin of component (A) in an organic solvent having dissolved therein the cyclic olefin polymer of component (B).

[2] Method of production of porous molded article

The porous molded article of the invention is produced by molding the above-described crystalline olefinic resin composition in a desired form and thereafter, stretching the molded product. There is no particular restriction on the molded article before stretching. That is, an article formed by using a conventional molding method, such as a film, a sheet, or a hollow-fiber membrane extruded from a die, a press-molded sheet, an inflation film, or the like, can be used.

Also, there in no particular restriction on the stretching method, and a stretching method such as a roll stretching method, a tenter stretching method, a calendar rolling method, an inflation mandrel method, or the like, can be used. Also, in stretching, the molded product is stretched in at least one direction usually from 1.1 to 30 times, preferably from 1.5 to 20 times, and particularly preferably from 4 to 12 times. In this case, a known stretching method such as a single-stage stretching method which stretches under constant conditions of stretching speed and stretching temperature, a multi-stage stretching method in which the stretching conditions change during stretching, and the like can be used. Also, in the case of stretching a film in two directions, the film can be simultaneously stretched in two directions or successively stretched in one direction and then in another directions. Also, a stretching operation which is a combination of the multi-stage stretching method and stretching in successive steps can be used.

The film can be stretched in area from 1.2 to 100 times, preferably from 1.5 to 50 times, and more preferably from 3 to 40 times.

The temperature of stretching is a temperature lower than the melting point of the olefinic resin of component (A) and also a temperature lower than the glass transition temperature of component (B), and is in the range of usually from −20° C. to 200° C., preferably from 50 to 180° C., and particularly preferably from 80 to 165° C. Also, after stretching, when the molded article obtained is subjected to a heat treatment (annealing) in the stretched state at the stretching temperature or higher, the dimensional stability of the porous molded article is improved.

When component (A) is a propylene series resin, in order to increase the voids and the opacity thereof, biaxial stretching is preferred and in this case. The film is stretched preferably from 4 to 12 times in each of the lengthwise and width directions.

When the porous molded article is a film-form material, the film can be laminated with another resin film in the production of the film and in this case, if necessary, an adhesive or an adhesive resin layer is used. The material for the other resin film in this case includes crystalline olefin resins such as an ethylene series resin, a propylene series resin, or the like; a polyester resin such as polyethylene terephthalate, polybutylene terephthalate, or the like; a polyamide resin such as nylon 6, nylon 66, or the like; polyvinyl chloride; polystyrene, or the like.

These other resin films may contain an inorganic filler such an calcium carbonate, talc, titanium oxide, clay, barium sulfate, or the like. The lamination of the resin film onto the porous molded article is carried out using an adhesive or the films are co-extruded in the case the base material film of the porous molded article is prepared followed by stretching.

Practical examples of the adhesive used in the above-described case include liquid adhesives such as an acrylic resin emulsion, a vinyl acetate-acrylic acid ester copolymer emulsion, an ethylene-vinyl acetate copolymer emulsion, a polyether polyol-polyisocyanate series (two part type) adhesive, an acrylurethane resin adhesive, a polyester polyol-polyisocyanate series two-part-type adhesive, or the like; and hot melt type adhesives such as maleic anhydride graft-denatured polypropylene, maleic anhydride graft-denatured polyethylene, acrylic acid or methacrylic acid graft-denatured polypropylene, an ethylene-acrylic acid copolymer, an ethylene-methacrylic acid copolymer, an ethylene-methyl acrylate copolymer, or the like.

[3] Porous molded article

The porous molded article of the invention can be formed into a desired shape such as a single layer film, a laminated film, hollow fibers, or the like, according to use.

Because the porous molded article has many continuous or closed microvoids or fine holes in the inside of the molded article, the porous molded article can be used in various ways such as, for example, a filter such as a dust-proof filter, a germ-removing filter, a deodorizing filter, a reverse osmosis filtration membrane, an ultrafiltration membrane, a precise filtration membrane, or the like; a separator such as a separator for a cell, a diaphragm for an electrolytic capacitor, a gas-separation membrane, an ion-exchange membrane, a moisture-permeable water-proof membrane, or the like; a synthetic paper such as an opaque film, a poster paper, or the like.

The porous molded article (stretched film) for use as a synthetic paper having a voids content of from 20 to 75%, and preferably from 25 to 65% and an opacity (JIS P-8138) of 70% or higher, and preferably from 75 to 100% is preferred.

If the void space is less than 20%, the diffused reflection of light is insufficient and a paper-like feel is not obtained. Also, if the void space is more than 75%, the film becomes brittle.

If the opacity is lower than 70%, the concealing power of back print is insufficient. When the films applied with different prints are superposed on each other, if the opacity of the film is low, the print on the lower film can be seen through the upper film and in the case of duplex printing, the print on the back surface is seen double, which makes it difficult to see the print on the front surface.

The stretched film itself is useful as a poster paper or a drafting paper or the stretched film having formed on its surface a gelatin layer, a heat-sensitive recording coated layer, or an image-receiving recording layer is useful as a support for a light-sensitive photographic paper, a heat-sensitive recording paper, or a heat-transfer image-receiving paper.

The thickness of the stretched film is usually from 10 to 500 μm, and preferably from 20 to 200 μm and is properly selected according to uses.

Having generally described this invention, a further understanding can be obtained by reference to certain specific examples which are provided herein for purpose of illustration only and are not intended to be limiting unless otherwise specified.

The molding conditions for obtaining each test sample from each resin composition produced in the examples and the comparative examples and the test method are shown after the following polymerization examples or the examples. In addition, the term parts in each example means parts by weight.

Production of cyclic olefin polymer

Polymerization Example 1

In a one liter autoclave were placed 450 ml of a toluene solution containing 30 g of norbornene ($C_7H_{10}$) and 51.3 ml of a toluene solution of polymethylaluminoxane (concentration 85 mg/ml) followed by stirring at 70° C. for 15 minutes.

Then, 65.7 mg of cyclopentadienylzirconium trichloride was added to the mixture as a catalyst and the reaction was carried out at a polymerization temperature of 70° C. for 4 hours. The reaction mixture was added to a hydrochloric acid-acidified methanol solution, after collecting the white solid precipitated by filtration, the white solid was repeatedly washed with methanol until the washed liquid became neutral. Thereafter, the white solid (the homopolymer of norbornene) obtained was dried under a reduced pressure.

The amount of the polymer obtained was 25.3 g. As the result of measuring the molecular weight by GPC, the weight average molecular weight (Mw) was 3,200 and Mw/Mn was 1.51. Also, as the result of the DSC measurement, the glass transition point was 210° C. According to measurement by 13C-NMR, it was found that the polymerization randomly proceeded and the polymer kept the ring structure.

The polymer is defined as NBO (1).

Polymerization Example 2

By following the same polymerization procedure as described in Polymerization Example 1 except that the added amount of norbornene was changed to 50 g, a white solid was obtained. The amount of the polymer was 44.8 g. As the result of measuring the molecular weight by GPC, the Mw was 4,700 and Mw/Mn was 1.68. Also, as the result of the DSC measurement, the glass transition point was 240° C. The polymer is defined as NBO (2)

Polymerization Example 3

By following the same polymerization procedure as described in Polymerization Example 1 except that the added amount of norbornene was changed to 50 g and 38.4 ml of a toluene solution of methylisobutylaluminoxane (concentration 113 mg/ml) was used in place of the toluene solution of polymethylaluminoxane, a white solid was obtained. The amount of the polymer was 39.1 g. As the result of measuring the molecular weight by GPC, the Mw was 45,000 and Mw/Mn was 2.13. Also, in the DSC measurement, the decomposition of the polymer began before the glass transition point, whereby the glass transition point could not be measured.

The polymer is defined as NBO (3)

GPC measurement conditions:

Apparatus: Gel permeation chromatograph measurement apparatus, GPC150C (trade name, made by Waters Co.)

Column: AD80M/Sx3 (trade name, made by SHOWA DENKO K. K.)

Solvent: o-Dichlorobenzene

Temperature: 140° C.

Flow rate: 1.0 ml/minute

Concentration: 20 mg/ml

IR: 3.42 μ

Injected amount: 200 μl

From the GPC measurement under the above-described conditions, the weight average molecular weight of a polypropylene conversion was calculated.

DSC measurement conditions

Apparatus: Differential scanning calorimetry DSC-SS5200 (trade name, made by Seiko Instruments Inc.)

Temperature increasing speed: 20° C./minute

Sample amount: 10 mg

EXAMPLE 1

Mixture of components and preparation of film

In one liter of xylene (containing 0.2% by weight 2,6-di-t-butyl-p-cresol as a stabilizer) at 140° C. were dissolved 40 g (80% by weight) of a propylene homopolymer (melting temperature 164° C., crystallinity 67%) having MFR of 1 g/10 minutes and 10 g (20% by weight) of NBO (1) (weight average molecular weight 3,200, glass transition temperature 210° C.), after stirring the mixture for 60 minutes, 5 liters of methanol as a poor solvent was gradually added thereto to deposit the product. After removing the greater part of the solvent by filtration, the residue was dried under a reduced pressure to provide a composition (Composition 1) of polypropylene and NBO (1), which was ground.

After pressing while heating the ground product for 4 minutes at 240° C. and the highest pressure of 4.9 Mpa (50 kg-f/cm$^2$) using a press molding machine Type F-37 (trade name, manufactured by Shinto Kinzoku Kogyosho K.K.), the product was quickly cooled by a cooling press of 30° C. at a pressure of 9.8 Mpa (100 kg-f/cm$^2$) to form a press sheet. After heating the press sheet to 155° C. using a small-sized biaxial stretching machine (manufactured by Iwamoto Seisaku Sho K.K.), the sheet was simultaneously stretched 5 times in the lengthwise direction and 5 times in the width direction. Then, the stretched sheet was cooled by air to 90° C. to provide a biaxially stretched film.

Surface treatment of film

Then, using a corona discharging treatment apparatus, HFS400F (trade name, manufactured by Kasuga Denki K. K.), a corona treatment was applied to the surface of the film using an aluminum electrode having a length of 0.8 meter and a silicon-coated roll as a treater roll, at a gap between the electrode and the roll of 5 mm, a line speed of 15 m/minute, and an applied energy density of 4,200 J/m$^2$.

Evaluation of film

The results of measuring the thickness, the density (JIS P-8118-1976), and the opacity (JIS P-8138-1976) of the biaxially stretched film obtained are shown in Table 5 below.

Evaluation of solvent attack

On one surface of the stretched film was spread a wide-use offset ink "Superteck Process [Sumi (Indian ink)]" (trade name, made by K.K. T & K Toka) for general pulp papers by an RI tester (manufactured by K.K. Akira Seisakusho) at a coverage of 2 g/m$^2$, after allowing the film to stand for 24 hours under the conditions of a temperature of 23° C. and a relative humidity of 50%. The film was cut into a regular square of 10 cm×10 cm, after 3 hours. The cut film was placed on a flat plate, and the raised heights of the 4 corners thereof were measured as shown in FIG. 1.

In FIG. 1, 1 denotes a printed matter, 2 denotes a flat plate, and h denotes a height of a curl of the printed matter.
The result was evaluated by the following grades.
The mean value of the raised heights of the 4 corners is;
within 2 mm, the sample is "o" (good),
within 2 to 5 mm, the sample is "Δ" (less)
higher than 5 mm, the sample is "x" (bad).

The evaluation result is shown in Table 3 below.

Comparative Example 1

After dissolving 79.6% by weight a propylene homopolymer (melting point 164° C., crystallinity 67%) having MFR of 1 g/10 minutes, 20% by weight of NBO (3) in place of NBO (1), and 0.4% by weight 2,6-di-t-butyl-p-cresol in a xylene solvent at 140° C., the product was deposited in methanol, the deposited product was collected by filtration and dried to provide a preblend mixture. Then, after kneading the mixture obtained by a Labo Plasto Mill kneading machine (trade name, manufactured by Toyo Seiki Seisakusho K.K.) under the conditions of 270° C., 50 r.p.m., and 3 minutes, the kneaded mixture was ground to provide a granular resin composition. In addition, at melt kneading, 0.2 part by weight of 2,6-di-t-butylphenol and 0.2 part by weight of Irganox 1010 (trade name, made by Ciba-Geigy Corporation) were added to the mixture to 100 parts by weight of the sum total of the components as stabilizers.

Using the granular resin composition obtained, the press molding, stretching, and the corona treatment were carried out as described in Example 1.

The evaluation results of the biaxially stretched film obtained are shown in Table 3 below.

Comparative Example 2

After compounding 79.6% by weight a propylene homopolymer (melting point 164° C., crystallinity 67%) having MFR of 1 g/10 minutes with 20% by wight a dicyclopentadiene series petroleum resin "Escorez E 5320" (trade name, made by Tonex Company Limited) (glass transition temperature 70° C., weight average molecular weight 600, softening point 125° C.) in place of NBO (1), 0.2% by weight of 2,6-di-t-butyl-p-cresol and 0.2% by weight Irganox (trade name, made by Ciba-Geigy Corporation) as stabilizers, the mixture was melt-kneaded by a biaxial kneading machine (manufactured by Tosoku Seomitsu K.K.) at 250° C. and thereafter, the kneaded mixture was extruded from a die into a strand, cooled and cut to provide pellets. Using the pellets obtained, press molding, stretching, and the corona surface treatment were carried out as described in Example 1. The results of evaluation of the biaxially stretched film are shown in Table 3 below.

Comparative Example 3

By following the same procedure as described in Comparative Example 1, except that 79.6% by weight a propylene homopolymer (meting point 164° C., crystallinity 67%) having an MFR of 1 g/10 minutes, 20% by weight a copolymer of tetracyclo[4,4,0,1$^{2.5}$, 1$^{7.12}$], "APEL 5018" (trade name, made by Mitsui Petrochemical Industries, Ltd., glass transition temperature 165° C., weight average molecular weight 53,000) in place of NBO (1), 0.2% by weight 2,6-di-t-butyl-p-cresol, and 0.2% by weight Irganox 1010 were used, a biaxially stretched film was formed and evaluated. The evaluation results are shown in Table 3 below.

Comparative Example 4

By following the same procedure as described in Comparative Example 2 except that 79.3% by weight a propylene homopolymer (melting point 164° C.) having MFR of 1 g/10 minutes, 20% by weight calcium carbonate having an average particle size of 1.3 μm, 0.3% by weight oleic acid, 0.2% by weight 2,6-di-t-butyl-p-cresol, and 0.2% by weight Irganox 1010 were used, a biaxially stretched film was prepared and evaluated. The results of evaluation are shown in Table 3 below.

Comparative Example 5

The same evaluations as described in Example 1 were carried out using a polypropylene series synthetic paper "YUPO FPG-95" (trade name, made by Oji Yuka Goseishi K.K.) made up of a fine inorganic powder-containing polypropylene series stretched film. The results are shown in Table 3 below.

EXAMPLE 2

After compounding 627.2 g (89.6% by weight) of polypropylene (dissolution peak temperature 164° C.) having an MFR of 1 g/10 minutes with 70 g (10% by weight) of NBO (1), 1.4 g (0.2% by weight) of 2,6-di-t-butyl-p-cresol and 1.4 g (0.2% by weight) of Irganox 1010 (trade name, made by Ciba-Geigy Corporation) as stabilizers, the mixture was melt-kneaded by a biaxial kneader (manufactured by Tosoku Seimitsu K.K.) at 250° C. Thereafter, the kneaded mixture was extruded from a die into a strand, cooled, and cut to provide pellets.

Using the pellets obtained, press molding, stretching, and the surface corona treatment were carried out in the same manner as described in Example 1. The results of evaluation of the stretched film obtained are shown in Table 4 below.

EXAMPLE 3

By following the same procedure as described in Example 1, except that the amount of the polypropylene was changed to 69.6% by weight and the amount of NBO (1) was changed to 30% by weight, a biaxially stretched film was formed and evaluated.

Comparative Example 6

After molding a press sheet by following the same procedure as described in Example 1, except that the amount of the polypropylene was changed to 35% by weight and the amount of NBO (1) was changed to 65% by weight, biaxial stretching was applied to the sheet but the sheet was fractured during stretching and a stretched film was not obtained.

EXAMPLE 4

After compounding 79.6% by weight polypropylene (dissolution peak temperature 164° C., crystallinity 70%) having MFR of 0.8 g/10 minutes with 20% by weight NBO (2) (weight average molecular weight 4,700, glass transition temperature 240° C.), 0.2% by weight 2,6-di-t-butyl-p-cresol and 0.2% by weight Irganox 1010 (trade name, made by Ciba-Geigy Corporation) as stabilizers, the mixture was melt-kneaded by a biaxial kneader (manufactured by Tosoku Seimitsu K.K.) at 270° C. Thereafter, the kneaded mixture was extruded from a die into a strand form, cooled, and cut to provide pellets.

Using the pellets obtained, press molding, stretching, and the surface corona treatment were carried out by the same manners as described in Example 1, except that the stretching temperature was changed to 153° C. and the stretching times were changed to 5 times in the lengthwise direction and 5 times in the width direction. The results of evaluation of the stretched film obtained are shown in Table 5 below.

EXAMPLE 5

By following the same procedure as described in Example 1 except that the amount of polypropylne (melting point 164° C.) having MFR of 1 g/10 minutes was changed to 79.6% by weight, the amount of NBO (1) (weight average molecular weight 3,200, glass transition temperature 210° C.) was changed 20% by weight, the kneading temperature was changed to 250° C., the stretching temperature was changed to 153° C., and the stretching times were changed to 6 times in the lengthwise direction and 6 times in the width direction, a biaxial stretched film was obtained. The evaluation results of the stretched film are shown in table 5 below.

EXAMPLE 6

After compounding 79,6% by weight polypropylene (melting point 164° C.) having MFR of 3.5 g/10 minutes with 20% by wight NBO (1) (wight average molecular weight 3,200, glass transition temperature 210° C.) and 0.2% by weight 2,6-di-t-butyl-p-cresol and 0.2% by weight Irganox 1010 (trade name, made by Ciba-Geigy Corporation) as stabilizers, the compounded mixture was melt-kneaded by a biaxial kneading extruder at 250° C., and extruded into a strand which was cut to provide pellets.

After pressing by heating the pellets using a compression molding machine (Type F-37) manufactured by Shinto Kinzoku Kogyosho K.K., at a temperature of 240° C. and the highest pressure of 4.9 Mpa (50 kg-f/cm$^2$) for 4 minutes, the pressed product was quickly cooled by a cooling press of a temperature of 30° C. and a pressure of 9.8 Mpa (100 kg-f/cm$^2$) to form a press sheet. After heating the press sheet to 155° C. by a small-sized biaxial stretching machine (manufactured by Iwamoto Seisakusho K.K.), the press sheet was stretched 8 times in the lengthwise direction only and cooled by air to 90° C. to provide a uniaxially stretched film. Furthermore, the surface corona treatment as described in Example 1 was applied to the film. The results of evaluation of the stretched film obtained are shown in Table 5 below.

EXAMPLE 7

After compounding 59.6 parts by wight of polypropylene (melting point 164° C., crystallinity 64%) having MFR of 3.5 g/10 minutes with 20 parts by weight of NBO (1) (weight average molecular weight 3,200, glass transition temperature 210° C.), 20 parts by weight of heavy calcium carbonate (shown as "calcium carbonate" in the tables) having a 50% weight average cumulative particle size measured by a microtrack (Microtrack MKII particle size analyzer, SPA Model 17997-20, trade name, manufactured by Nikkiso K.K.) of 1.5 μm, and 0.2 part by weight of 2,6-di-t-butyl-p-cresol and 0.2 part by weight of Irganox 1010 (trade name, made by Ciba-Geigy Corporation) as stabilizers, the compounded mixture was melt-kneaded by a biaxial kneader (manufactured by Tosoku Seimitsu K.K.) at 270° C., extruded from the die into a strand, and cut to provide pellets.

Using the pellets, film molding, stretching, and the surface corona treatment were carried out as described in Example 1 except that the stretching temperature was changed to 156° C. The results of evaluation of the stretched film obtained are shown in Table 5 below.

TABLE 3

| | Item | Unit | Example 1 | Comparative Example 1 | Comparative Example 2 | Comparative Example 3 | Comparative Example 4 | Comparative Example 5 |
|---|---|---|---|---|---|---|---|---|
| Raw Material Compounding | MFR of PP | g/10 minutes | 1 | 1 | 1 | 1 | 1 | Yupo FRG-95 |
| | Melting point of PP | ° C. | 164 | 164 | 164 | 164 | 164 | |
| | Compounded amount of PP | wt % | 79.6 | 79.6 | 79.6 | 79.6 | 79.6 | |
| | Kind of cyclic olefin polymer | — | NBO(1) | NBO(3) | — | — | — | |
| | Mw of cyclic olefin polymer | — | 3200 | 45,000 | — | — | — | |
| | Tg of cyclic olefin polymer | ° C. | 210 | — | — | — | — | |
| | Compounded amount of cyclic olefin polymer | wt % | 20 | 20 | — | — | — | |
| | Kind of other components | — | — | — | petroleum resin | APEL | calcium carbonate | |
| | Mw of other components | — | — | — | 660 | 53,000 | — | |
| | Tg of other components | ° C. | — | — | 84 | 165 | — | |
| | Compounded amount of other components | wt % | — | — | 20 | 20 | 20 | |
| Stretching | Stretching axial no. | — | biaxial | biaxial | biaxial | biaxial | biaxial | |
| | Stretching times (lengthwise × width) | times | 5 × 5 | 5 × 5 | 5 × 5 | 5 × 5 | 5 × 5 | |
| | Stretching temperature | ° C. | 155 | 155 | 155 | 155 | 155 | |
| Evaluation of Film | Thickness | μm | 85 | 84 | 85 | 84 | 85 | 95 |
| | Density | g/cm$^3$ | 0.62 | 0.82 | 0.93 | 0.56 | 0.95 | 0.77 |
| | Voids | % | 33 | 12 | 0 | 40 | 9 | 31 |
| | Opacity | % | 95 | 71 | 9 | 83 | 37 | 92 |
| | Curl of printed film | — | ○ | x | ○ | x | x | x |

TABLE 4

| | Item | unit | Example 2 | Example 3 | Comparative Example 6 |
|---|---|---|---|---|---|
| Raw Material Compounding | MFR of PP | g/10 minutes | 1 | 1 | 1 |
| | Melting point of PP | °C. | 164 | 164 | 164 |
| | Compounded amount of PP | wt % | 89.6 | 69.6 | 34.6 |
| | Kind of cyclic olefin polymer | — | NBO(1) | NBO(1) | NBO(1) |
| | Mw of cyclic olefin polymer | — | 3200 | 3200 | 3200 |
| | Tg of cyclic olefin polymer | °C. | 210 | 210 | 210 |
| | Compounded amount of cyclic olefin polymer | wt % | 10 | 30 | 65 |
| | Kind of other components | — | — | — | — |
| | Mw of other components | — | — | — | — |
| | Tg of other components | °C. | — | — | — |
| | Compounded amount of other components | wt % | — | — | — |
| Stretching | Stretching axial no. | — | biaxial | biaxial | biaxial |
| | Stretching times (lengthwise × width) | times | 5 × 5 | 5 × 5 | fractured during stretching |
| | Stretching temperature | °C. | 150 | 156 | 156 |
| Evaluation of Film | Thickness | μm | 78 | 98 | — |
| | Density | g/cm³ | 0.65 | 0.55 | — |
| | Voids | % | 29 | 42 | — |
| | Opacity | % | 71 | 96 | — |
| | Curl of printed film | — | ○ | ○ | — |

TABLE 5

| | Item | unit | Example 4 | Example 5 | Example 6 | Example 7 |
|---|---|---|---|---|---|---|
| Raw Material Compounding | MFR of PP | g/10 minutes | 0.8 | 1 | 3.5 | 3.5 |
| | Melting point of PP | °C. | 164 | 164 | 164 | 164 |
| | Compounded amount of PP | wt % | 79.6 | 79.6 | 79.6 | 59.6 |
| | Kind of cyclic olefin polymer | — | NBO(2) | NBO(1) | NBO(1) | NBO(1) |
| | Mw of cyclic olefin polymer | — | 4700 | 3200 | 3200 | 3200 |
| | Tg of cyclic olefin polymer | °C. | 240 | 210 | 210 | 210 |
| | Compounded amount of cyclic olefin polymer | wt % | 20 | 20 | 20 | 20 |
| | Kind of other components | — | — | — | — | calcium carbonate |
| | Mw of other components | — | — | — | — | — |
| | Tg of other components | °C. | — | — | — | — |
| | Compounded amount of other components | wt % | — | — | — | 20 |
| Stretching | Stretching axial no. | — | biaxial | biaxial | uniaxial | biaxial |
| | Stretching times (lengthwise × width) | times | 5 × 5 | 6 × 6 | 8 | 5 × 5 |
| | Stretching temperature | °C. | 153 | 153 | 155 | 157 |
| Evaluation of Film | Thickness | μm | 80 | 43 | 110 | 77 |
| | Density | g/cm³ | 0.64 | 0.44 | 0.71 | 0.70 |

TABLE 5-continued

| Item | unit | Example 4 | Example 5 | Example 6 | Example 7 |
|---|---|---|---|---|---|
| Voids | % | 31 | 53 | 24 | 35 |
| Opacity | % | 91 | 95 | 88 | 90 |
| Curl of printed film | — | ○ | ○ | ○ | ○ |

Comparative Example 7

After pressing by heating the ground product of Composition 1 of the resin obtained by the same procedure as described in Example 1 using the compression molding machine as used in Example 1 at a temperature of 250° C. and the highest pressure of 6.4 Mpa (65 kg-f/cm$^2$) for 5 minutes, the pressed product was quickly cooled by a cooling press at a temperature of 30° C. and a pressure of 11.8 Mpa (120 kg-f/cm$^2$) to prepare a compression-molded film of 85 μm in thickness.

The density of the film was 0.93 g/cm$^3$, the void space was 0%, and the opacity was 16%.

EXAMPLE 8

(1) A composition obtained by compounding 80% by weight polypropylene having an MFR of 0.8 g/10 minutes and a melting point of 167° C. with 20% by weight heavy calcium carbonate having a 50% weight cumulative particle size measured by a microtrack of 1.5 μm was melt-kneaded by an extruder at a temperature of 250° C., thereafter was extruded from the die as a sheet, and further cooled to 60° C. by a cooling means to provide a non-stretched sheet.

Then, after heating the sheet by contacting with a heat roll of 150° C. the sheet was stretched 4.5 times in the lengthwise direction to provide a uniaxially stretched film (c).

(2) After mixing 79.6 parts by weight of polypropylene having MFR of 3.5 g/10 minutes and a melting point of 164° C. with 20 parts by weight of the cyclic olefin polymer, NBO (1) and 0.2 part by weight of 2,6-di-t-butyl-p-cresol and 0.2 part by weight of Irganox 1010 (trade name, made by Ciba-Geigy Corporation) as stabilizers, the mixture was melt-kneaded by a biaxial kneading extruder at a temperature of 270° C. to provide a resin composition (a). The composition was extruded into a strand and cut to provide pellets.

The pellets were melted by each of two extruders at a temperature of 250° C., separately supplied to each of two dies, extruded from the dies, laminated onto both surfaces of the above-described uniaxially stretched film, and melt-press adhered by a roll to provide a laminate (a/c/a).

Then, after cooling the laminated sheets to a temperature of 60° C., the sheets were heated to 155° C., stretched by a tenter 8 times in the width direction, subjected to an annealing treatment at 165° C., and cooled to 60° C. The edge portions of the sheet were split to provide a thermoplastic resin laminated stretched film of three-layer structure (thicknesses of a/c/a: 26 μm/70 μm/26 μm). The corona treatment was applied to the surface of the laminated stretched film by the same method as described in Example 1 and the film was evaluated.

The opacity of the film was 92% and the curl level of the printed film was good (○).

Also, the above-described laminated stretched film was cut into an area of 788 mm×545 mm, 200 such cut films were two-color printed by an offset two-color printing machine, "Daiya Process" (trade name, manufactured by Mitsubishi Heavy Industries, Ltd.) using offset inks "Supertec Process" (trade name, made by K.K. T & K Toka), and when the number of the prints until ink edge piles on the blanket or released powder on the paper on the blanket exerted a detrimental influence on the prints (i.e., the printable number until the indications of the so-called "paper powder trouble" occurred) was determined, the indications of the "paper powder trouble" were not observed until 2200 films.

Effect of the Invention

The porous molded material of the present invention can be produced by simple stretching over a wide stretching temperature range.

The porous molded material has many continuous or closed fine holes in the inside of the stretched molded material and can be used for various purposes, e.g., as various kinds of filters such as a dustproof filter, a germ-removing filter, a back osmosis filtration membrane, a ultrafiltration membrane, a precise filtration membrane, or the like; as a separator such as a separator for cells, a diaphragm for electrolytic capacitors, a gas separation membrane, an ion-exchange membrane, a moisture permeable waterproof membrane, or the like; as a synthetic paper for poster papers, or the like.

In these porous molded materials, a film-form material of the porous molded material having a void space of from 20 to 70% and an opacity of 75% or higher has excellent opacity, does not cause a solvent attack even when a commercially available offset ink for wood free papers is used, has excellent printability, and is particularly useful as a synthetic paper or packing material.

Obviously, numerous modifications and variations of the present invention are possible in light of the above teachings. It is, therefore, to be understood that within the scope of the appended claims, the invention may be practiced otherwise than as specifically described herein.

What is claimed is as new and is intended to be secured by Letters Patent is:

1. A porous molded article having microvoids therein, comprising: a stretched material of a resin molded product made up of, as the base material, an olefinic resin composition comprising from 95 to 50% by weight of a crystalline olefinic resin component (A) and from 5 to 50% by weight of a polymer of a cyclic olefin having a weight average molecular weight of not less than 1,000 and less than 10,000, and a glass transition point of from 180 to 400° C. component (B).

2. The porous molded article of claim 1, wherein the crystalline olefinic resin is an olefinic resin having a crystallinity of from 20 to 100% and a melting point of from 120 to 245° C.

3. The porous molded article of claim 2, wherein the crystalline olefinic resin is selected from the group consisting of a homopolymer of propylene, and a random or block copolymer of propylene and an α-olefin having from 2 to 12 (excluding 3) carbon atoms, said resin having a melting point of from 140 to 174° C. and a melt flow rate of from 0.1 to 50 g/10 minutes.

4. The porous molded article of claim 1, wherein the polymer of the cyclic olefin is a monocyclic cyclic olefin-vinylene polymer of formula (I) or a vinylene polymer obtained by polymerizing a polycyclic olefin of formula (II):

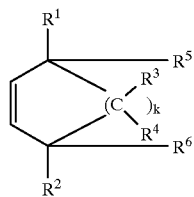

wherein $R^1$ to $R^4$ each independently represents hydrogen, a hydrocarbon group having from 1 to 20 carbon atoms, or a substituent containing a halogen atom; $R^5$ and $R^6$ each represents hydrogen; and k represents an integer of 0 to 4;

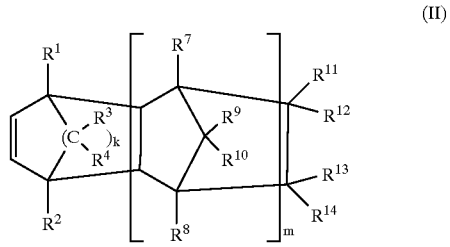

wherein $R^1$ to $R^4$ and $R^7$ to $R^{14}$ each independently represents hydrogen, a hydrocarbon group having from 1 to 20 carbon atoms, or a substituent containing a halogen atom: $R^9$ and one of $R^{11}$ to $R^{14}$ or $R^{10}$ and one of $R^{11}$ to $R^{14}$ may combine with each other to form a ring; k represents an integer of from 0 to 4; and m represents an integer of from 0 to 8.

5. The porous molded article of claim 4, wherein the polycyclic olefin is a norbornene series cyclic olefin of formula (II) wherein m is 0 and k is 1.

6. The porous molded article of claim 3, wherein the polymer of the cyclic olefin is a vinylene polymer having units based on a polycyclic olefin of formula (III), said vinylene polymer having a weight average molecular weight of from 2,000 to 7,000 and a glass transition point of from 180 to 270° C.;

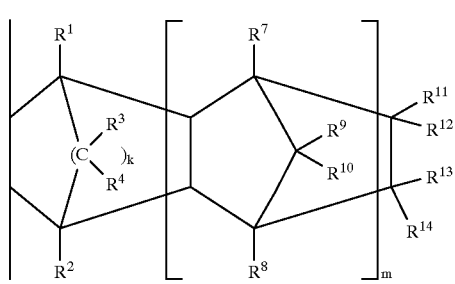

wherein $R^1$ to $R^4$ and $R^7$ to $R^{14}$ each independently represents hydrogen, a hydrocarbon group having from 1 to 20 carbon atoms, or a substituent containing a halogen atom: $R^9$ and one of $R^{11}$ to $R^{14}$ or $R^{10}$ and one of $R^{11}$ to $R^{14}$ may combine with each other to form a ring; k represents an integer of from 0 to 4; and m represents an integer of from 0 to 8; and $R^1$ to $R^{14}$ or k and m in said units of formula (III) may be the same or different.

7. The porous molded article of claim 4, wherein the vinylene polymer of the cyclic olefin has a glass transition point of from 200 to 270° C.

8. The porous molded article of claim 1, wherein the porous molded article has a void space determined by the equation:

$$\text{voids}(\%)=[(\rho o)-(\rho)]/(\rho o)\times 100$$

wherein ($\rho o$) is the density of a film before stretching and ($\rho$) is the density of the film after stretching, of from 20 to 70%.

9. The porous molded article of claim 1, wherein the opacity of the porous molded article is at least 70%.

10. The porous molded article of claim 1, wherein the porous molded article has fine holes formed in the inside of the film fine holes by stretching a resin film made up of, as the base material, an olefinic resin composition containing from 95 to 50% by weight a crystalline olefinic resin component (A) and from 5 to 50% by weight a polymer of a cyclic olefin having a weight average molecular weight of not less than 1,000 and less than 10,000, and a glass transition point of from 180 to 270° C. component (B).

11. The porous molded article obtained by stretching a resin film made up of, as the base material, a resin composition containing from 95 to 50% by weight a propylene series resin component (A) and from 5 to 50% by weight of a vinylene polymer of a polycyclic olefin having units of formula (III), and having a weight average molecular weight of from 2,000 to 7,000 and a glass transition point of from 180 to 270° C. or a vinylene polymer of a polycyclic olefin made up of units of formula (IV) component (B);

at a temperature lower than the melting point of component (A) and at a temperature lower than the glass transition point of the vinylene polymer of the cyclic olefin of component (B), said porous molded article having a void space of from 20 to 70% as determined by the equation:

$$\text{voids}(\%)=[(\rho o)-(\rho)]/(\rho o)\times 100$$

wherein ($\rho o$) is the density of a film before stretching and ($\rho$) is the density of the film after stretching;

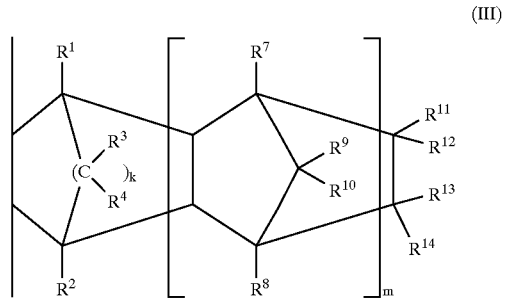

wherein $R^1$ to $R^4$ and $R^7$ to $R^{14}$ each independently represents hydrogen, a hydrocarbon group having from 1 to 20 carbon atoms, or a substituent containing a halogen atom: $R^9$ and one of $R^{11}$ to $R^{14}$ or $R^{10}$ and one of $R^{11}$ to $R^{14}$ may combine with each other to form a ring; k represents an integer of from 0 to 4; and m represents an integer of from 0 to 8;

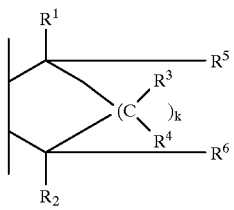

wherein $R^1$ to $R^4$ each independently represents hydrogen, a hydrocarbon group having from 1 to 20 carbon atoms, or a substituent containing a halogen atom; $R^5$ and $R^6$ each represents a hydrogen atom; and k represents an integer of from 0 to 4.

12. The porous molded article of claim 1, wherein the polymer component (B) has a glass transition point of 200° C. to 270° C.

13. The porous molded article of claim 1, wherein said crystalline olefinic resin is prepared by the polymerization of ethylene or and α-olefin of up to 12 carbon atoms.

14. The porous molded article of claim 4, wherein the vinylene polymer of formula (I) is prepared by the polymerization of a cyclopentene or a cyclohexene.

15. The porous molded article of claim 4, wherein the vinylene polymer of formula (II) is prepared by the polymerization of a norbornene, a tricyclo-3-decene, a dicyclopentadiene, a tetracyclo-3-dodecene, a pentacyclopentadecene, a pentacyclopentadecadiene or a hexacyclo-[6,6,1,1$^{3.6}$,1$^{10.13}$,0$^{2.7}$,0$^{9.14}$]-4-heptadecene.

* * * * *